United States Patent
Forss et al.

(10) Patent No.: US 7,040,136 B2
(45) Date of Patent: May 9, 2006

(54) APPARATUS AND A METHOD FOR CALIBRATION OF AN INDUSTRIAL ROBOT

(75) Inventors: Torbjörn Forss, Västerås (SE); Karl-Gunnar Johnsson, Västerås (SE); Jan Larsson, Västerås (SE); Stig Persson, Västerås (SE); Tomas Gustavsson, Västerås (SE)

(73) Assignee: ABB AB, Västerås (SE)

( * ) Notice: Subject to any disclaimer, the term of this patent is extended or adjusted under 35 U.S.C. 154(b) by 73 days.

(21) Appl. No.: 10/474,970

(22) PCT Filed: Feb. 15, 2002

(86) PCT No.: PCT/SE02/00266

§ 371 (c)(1),
(2), (4) Date: Jul. 13, 2004

(87) PCT Pub. No.: WO02/084216

PCT Pub. Date: Oct. 24, 2002

(65) Prior Publication Data

US 2004/0244462 A1    Dec. 9, 2004

Related U.S. Application Data

(63) Continuation of application No. 09/835,350, filed on Apr. 17, 2001, now Pat. No. 6,418,774.

(51) Int. Cl.
*G01C 17/38*    (2006.01)
(52) U.S. Cl. ......................................................... 73/1.75
(58) Field of Classification Search .................. 73/1.75
See application file for complete search history.

(56) References Cited

U.S. PATENT DOCUMENTS

| | | |
|---|---|---|
| 3,146,529 A | 9/1964 | Chamberlin |
| 4,505,049 A | 3/1985 | Kuno et al. |
| 5,210,954 A | 5/1993 | Schafler |
| 5,239,855 A | 8/1993 | Schleiffer et al. |

*Primary Examiner*—Robert Raevis
(74) *Attorney, Agent, or Firm*—Venable LLP; Eric J. Franklin

(57) ABSTRACT

An apparatus for calibration of an industrial robot, the apparatus comprising a body (7) having a first angle-measuring member (10) arranged for measuring an angle relative to the vertical ine about a first measuring axis (12) and mouting means (8, 9, 25) for mounting the body to the robot during the calibration. The apparatus comprises a second angle-measuring member (11) arranged for measuring an angle relative to the vertical line about a second measuring axis (13) differing from the first measuring axis. A method for calibration of an industrial robot having a plurality of sections movably connected to each for rotation about a plurality of axes, using an apparatus according to claim 1 or 2, the method comprising: attaching the body (7) to a section of the robot, reading an angle measurement from the first angle-measuring member (10), moving the robot about a first axis in dependence of said angle measurement for the first angle-measuring member (10), reading an angle measurement fro the second angle-measuring member (11), and moving the robot about a second axis in dependence of said angle measurement from the second angle-measuring member (11).

20 Claims, 5 Drawing Sheets

APPARATUS AND A METHOD FOR CALIBRATION OF AN INDUSTRIAL ROBOT

This is a continuation of application Ser. No. 09/835,350 filed Apr. 17, 2001, now U.S. Pat. No. 6,418,774.

FIELD OF THE INVENTION

The present invention relates to an apparatus for calibration of an industrial robot, the apparatus comprising a body having a first angle-measuring member arranged for measuring an angle relative to the vertical line about a first measuring axis and mounting means for mounting the body to the robot during the calibration. The present invention also relates to a system for robot calibration comprising an industrial robot and an apparatus for calibration of the industrial robot. The present invention further relates to a method for calibration of an industrial robot having a first and a second axis. The present invention also relates to a computer program product in connection with the calibration of an industrial robot.

PRIOR ART

An industrial robot can be viewed as a chain of sections movably connected to each other. Two adjacent sections are joined to each other so that they either are rotatable relative to each other about a rotational axis or linearly displaceable relative to each other. The first section in the chain is the base of the robot and the last section usually constitutes a tool attachment. For the possibility to determine the position of the robot, each joint usually is provided with an angle-measuring device in the form of an encoder or a resolver indicating the position of the joint relative to a zero position. Before an industrial robot can be used it must be calibrated, which means that each of the angle-measuring devices is calibrated with reference to the zero position. The robot is calibrated in the production plant before it is delivered and sometimes on site before being set to work. Thereafter, the robot is calibrated after larger repairs such as motor or arm changes or after collisions.

In the U.S. Pat. No. 5,239,855, a known method of calibration is shown, in which an inclinometer or some other type of instrument for measuring the inclination is used to calibrate the angle-measuring devices. An inclinometer measures the angle between an object and the vertical line and is, for example, an electronic spirit level. The inclinometer is placed on a plane of reference on one of the sections, and generates a signal, which is a measure of the angle between the plane of reference of the section and the vertical line. Thereafter, the joint is moved in dependence of the generated signal until it has a predetermined angle relative to the vertical line. The other sections are calibrated in the same way.

The placement of the planes of reference against which the calibration device is to be attached is predetermined. The planes of reference consists of accurately machined surfaces to obtain a high degree of flatness. When the robot is to be calibrated, it is moved to a predetermined calibration configuration. In this configuration, at least one of the sections is usually oriented in a direction, which differs from the directions of the other sections. Usually, the angles between the length axes of the sections are approximately 90°. Thus, the planes of reference may have different directions depending on which section to be calibrated. The planes of reference are usually either horizontal or vertical during the calibration.

A problem with said method of calibration is that the inclinometer must be mounted on the planes of reference of the robot with a very high precision. The inclinometer is first put on an inclinometer plate, which is then mounted on an adapter plate. The adapter plate is then attached to the plane of reference. Depending on the direction of the plane of reference to be calibrated, today different adapter plates are used. Usually, one type of adapter plate is used for horizontal planes of reference and another type of adapter plate is used for vertical planes. This way of attaching the inclinometer to the robot includes a large number of sources of error. Examples of sources of error are mounting errors between the adapter plate and the plane of reference of the robot, mounting errors between the inclinometer plate and the adapter plate, and errors of tolerance of the adapter plate. The fact that several different adapter plates are used also contributes to increasing the mounting error.

An apparatus for calibration of an articulated robot is shown in U.S. Pat. No. 4,505,049. The calibration apparatus comprises an inclinometer provided on an inclinometer plate, which is mounted on one sidepiece of an L-shaped adapter plate. The other sidepiece of the L-shaped adapter plate has a flat surface adapted for being in contact with the plane of reference during the calibration. The flat surface of the adapter plate is provided with positioning means projecting from the surface and is adapted to fit in with corresponding receiving means formed in the plane of reference. The object of the positioning means is to establish a definitely determined positional relation between the surface and the plane of reference.

A common type of industrial robot comprises a base adapted for resting on a horizontal foundation and a stand, which is rotationally arranged relative to the base about a first vertical axis. Since the first axis is essentially parallel with the vertical line, it cannot be calibrated with an inclinometer attached to the stand. Accordingly, a second problem with the method of calibration described above is that it cannot calibrate rotational axes parallel with the vertical line.

SUMMARY OF THE INVENTION

The present invention has been developed to obviate the above-described disadvantages of the prior art and has as its object the provision of an apparatus and a method and a computer program product for calibration of an industrial robot, wherein the error during the mounting of the body on the plane of reference is reduced.

The apparatus according to the present invention is characterised in that the apparatus comprises a second angle-measuring member arranged for measuring an angle relative to the vertical line about a second measuring axis differing from the first measuring axis. By having two angle-measuring members arranged with an angle relative to each other, it is possible to calibrate in two directions without having to rotate the angle-measuring member. Advantageously, the second angle-measuring member is arranged essentially perpendicularly to the first angle-measuring member. This means that two axes being perpendicular to each other can be calibrated without reorientation of the body. This is advantageous, for example when the wrist axes are to be calibrated, i.e. the axes 3, 4, 5, and 6, for a robot having six axes. When the robot is in its predetermined calibration configuration, the axes 4 and 6 are parallel to each other and the axes 3 and 5 are perpendicular to the axes 4 and 6. During the calibration of the wrist axes, the body is placed on the outermost section, which is usually a tool attachment.

Thanks to the fact that the body comprises two angle-measuring members arranged perpendicularly to each other, all four axes can be calibrated without moving the body.

According to an embodiment of the invention, the mounting arrangement comprises three protruding contact elements being arranged so that the body is in contact with the plane of reference through said contact elements during the calibration. The calibration apparatus and the robot are connected to each other through the contact elements. By using three contact elements the contact area between the calibration apparatus and the plane of reference is reduced without reducing the stability in the connection. By reducing the contact area between the calibration apparatus and the robot, the mounting error is reduced as well. With three contact elements, there are at least three contact points between the body and the plane of reference of the robot, which means that the angle-measuring member and the robot are fixed relative to each other with at least three degrees of freedom. A stable attachment of the body against the robot is thus obtained. By positioning the contact elements so that they form corners of a triangle maximum stability is achieved.

According to an embodiment of the invention, each of the contact elements comprises a flat portion adapted for being in contact with the plane of reference during the calibration. From a manufacturing point of view it is an advantage to make the portion adapted for being in contact with the plane of reference flat.

According to a further embodiment of the invention, the mounting arrangement further comprises an attachment element for attaching the body to the plane of reference. Preferably, the attachment element is a screw. Thereby, a reliable and inexpensive attachment is obtained. Further, the screw and a corresponding hole in the plane of reference facilitates the positioning of the body relative to the plane of reference.

According to a further embodiment of the invention, the apparatus further comprises a mounting member for pivotally connecting the body to the robot. By this arrangement, it is possible to calibrate an essentially vertical axis of the robot by mounting the body to the robot such that the body, including the angle-measuring member, forms a pendulum. Hence, it will be possible to calibrate all the axes of the robot using one single body. In a further embodiment, the mounting member comprises a shaft having with an attachment element for attaching the shaft to the robot, the body being arranged pivotal about that shaft.

According to a further embodiment of the invention, the apparatus comprises a calibration element for mounting to the robot and the body comprises a portion adapted for being in contact with said calibration element during calibration. The robot comprises a first and a second section, the second section being coupled to the first section for rotation about an essentially vertical axis through the first section. For calibration of the vertical axis through the first section, the body is mounted to the second section and the calibration element is mounted to the first section. The robot is moved until the portion of the body is in contact with the calibration element mounted on the first section. When the second section is moved further, the calibration element pushes the body so that it pivots about the shaft, thus causing an angular change of the angle-measuring member. Since the signal from the angle-measuring member depends on the relative position between the first and the second section, it is possible to calibrate the vertical axis through the first section.

According to a further embodiment of the invention, the body is shaped so that its centre of gravity is displaced in relation to an axis through said mounting member and said portion adapted for being in contact with said calibration element. Thanks to the fact that the centre of gravity is displaced in relation to that axis, the measuring axis deviates from the vertical line when the body is moved into contact with the calibration element and thus it is possible to measure on both sides of the vertical line. The size of the displacement determines the size of the angular interval possible to measure before the measuring axis coincides with the vertical line.

According to a further embodiment of the invention, the body is essentially L-shaped having a first and a second branch arranged essentially perpendicularly to each other, said mounting member and said portion being located at or in the vicinity of the first branch. Such a body has a centre of gravity, which is displaced in relation to an axis through said mounting member and said portion adapted for being in contact with said calibration element when said mounting member is mounted to the stand of the robot.

According to a further embodiment of the invention, the body comprises a second mounting arrangement for mounting the body to a second plane of reference on the robot, said second mounting arrangement being arranged in an angle relative to the first mounting arrangement, said angle essentially corresponding to the angle between two planes of reference of the robot when the robot is in its calibration configuration. With such a second mounting arrangement, the same body can be used for calibration of planes of reference being arranged in two different directions. Accordingly, there is no need for using different calibration bodies or different adapter plates, such as in the prior art, for measuring two planes of reference with different angles relative to the vertical line. The consequence of this is that a source of error, which is difficult to master during calibration, directly disappears. The second mounting arrangement is preferably arranged essentially perpendicularly to the first mounting arrangement. If the mounting arrangements are arranged perpendicularly against each other, both horizontal and vertical planes of reference can be measured with the same body.

According to a further embodiment of the invention, the first mounting arrangement comprises key means adapted for cooperation with corresponding key means on the first plane of references, and the second mounting arrangement comprises key means adapted for cooperation with corresponding key means on the second plane of reference, the key means of the first mounting arrangement differing from the key means of the second mounting arrangement. The key means ensures that an operator attaches the body to the right calibration plane and in a right position. Thus, the key-means prevents the operator from by mistake mounting the body to the plane of reference in a wrong way. Since the body is provided with two mounting arrangements, there are two possibilities to mount the body on the plane of reference, but only one is correct. The key means of a certain plane of reference only fits in with the correct mounting arrangement and thus misplacement is avoided.

According to a further embodiment of the invention, each key means of the mounting arrangements comprises at least two protruding elements adapted to fit in with corresponding notches in the plane of reference and that the distance between the protruding elements differs between the first mounting arrangement and the second mounting arrangement.

According to a further embodiment of the invention, each key means of the mounting arrangements comprises at least one protruding element adapted to fit in with a corresponding notch in the plane of reference, and the key-means have different shape, such as wedge-shaped or quadrangular. The protruding elements can for instance differ by having different diameters or height.

According to a further embodiment of the invention, each key means of the mounting arrangements comprises at least one protruding element adapted to fit in with a corresponding notch in the plane of reference, and the key-means of the first and the second mounting arrangement have different shape. Preferably, the protruding element has an asymmetrical shape so that it only fits in one position relative to the corresponding notch.

According to a further embodiment of the invention, the robot is connected to a control system via a cabling member adapted for transferring power and signals between the robot and the control system and the apparatus comprises a junction member electrically connected to the angle-measuring member, the junction member being provided with a connector for connection to said cabling member and means for transferring power to the angle-measuring member and transferring measurement values from the angle-measuring member via said cabling member. By such an arrangement, the cable member being used for transferring power and signals between the robot and the control system can also be used for transferring power and signals between the control system and the angle-measuring member. An advantage with this arrangement is that the robot does not have to be provided with any extra cable for the calibration. By providing the calibration apparatus with such a junction member, the expenses in connection with providing each robot with an extra cable is avoided.

The method according to the present invention comprises: attaching the body to a section of the robot, reading an angle measurement from the first angle-measuring member, moving the robot about a first axis in dependence of said angle measurement from the first angle-measuring member, reading an angle measurement from the second angle-measuring member, and moving the robot about a second axis in dependence of said angle measurement from the second angle-measuring member.

According to an embodiment of the invention, the method further comprises: attaching the body to a section of the robot, reading an angle measurement from the first angle-measuring member, moving the robot about a first axis in dependence of said angle measurement from the first angle-measuring member, reading an angle measurement from the second angle-measuring member, and moving the robot about a second axis in dependence of said angle measurement from the second angle-measuring member.

The computer program product according to the invention comprises a computer-readable medium, having thereon a computer readable program means which, when run on a computer, makes the computer perform calibration of an industrial robot with the calibration apparatus according to the invention, including receiving an angle measurement from the first angle-measuring member, sending control signals to the robot about moving a first axis of the robot in dependence of said angle measurement from the first angle-measuring member, receiving an angle measurement from the second angle-measuring member, and sending control signals to the robot about moving a second axis in dependence of said angle measurement from the second angle-measuring member. Thus, the calibration is made automatically and therefore becomes more precise and accurate.

BRIEF DESCRIPTION OF THE DRAWINGS

The present invention will now be explained by different embodiments described as examples with reference to the appended drawings.

DESCRIPTION OF EMBODIMENTS

Figure 1:
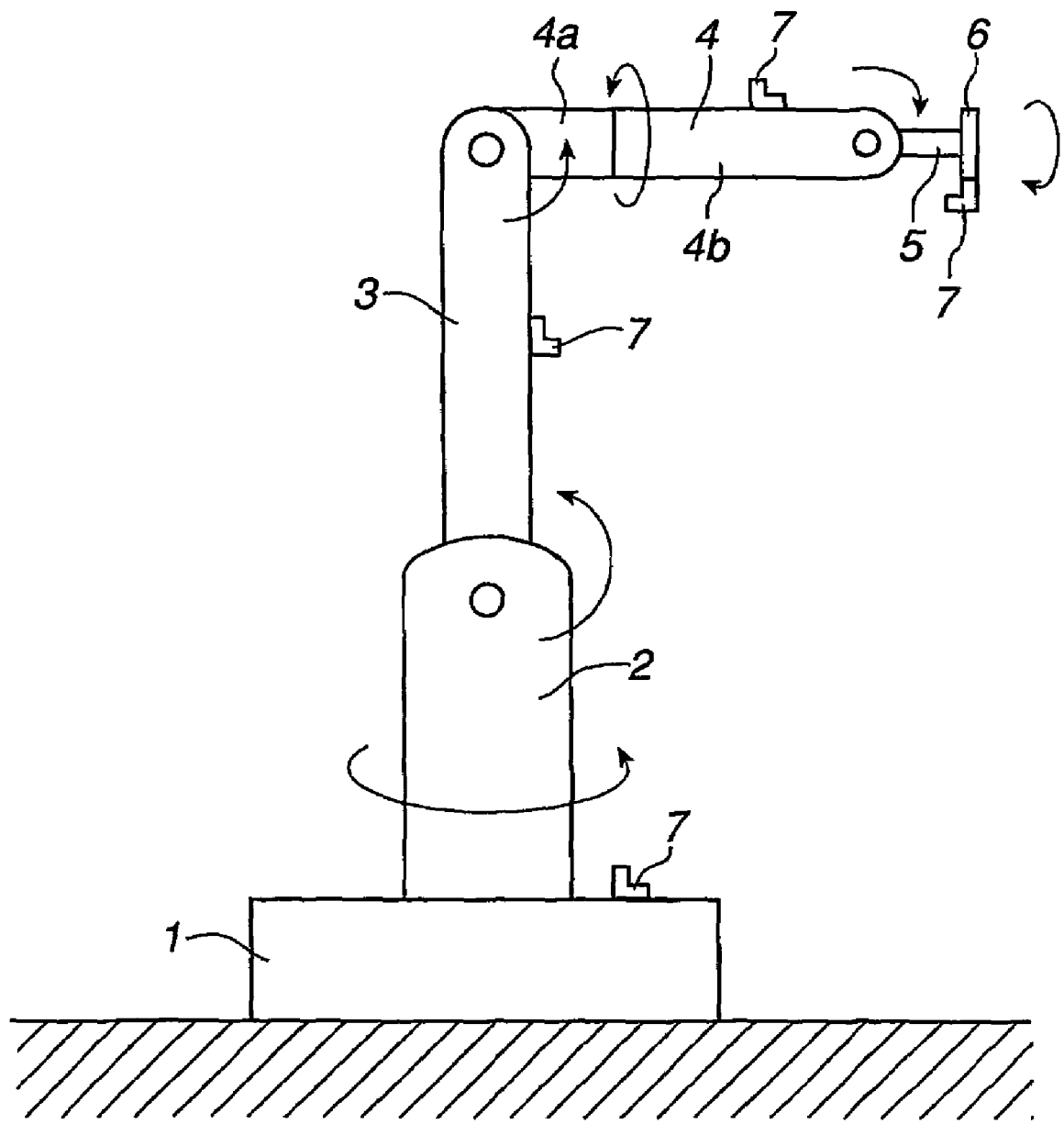
FIG. 1 shows an industrial robot in a calibration configuration having a calibration apparatus according to the invention mounted thereupon.

FIG. 1 shows an example of an industrial robot standing in a calibration configuration. The robot comprises a base 1, which is firmly mounted on a foundation. The robot further comprises a stand 2, which is rotatable relative to the base 1 around a first vertical axis. In the top end of the stand 2, a first robot arm 3, is rotatably mounted about a second horizontal axis. In the outer end of the first arm 3, a second arm 4 is rotatably mounted relative to the first arm about a third axis. The second robot arm 4 comprises two parts, 4a and 4b, and the outer part 4b being rotatable relative to the inner part 4a around a fourth axis coinciding with the longitudinal axis of the second arm 4. In its outer end, the second arm 4 supports a so-called robot hand 5, which is rotatable about a fifth axis, which is perpendicular to the length axis of the second arm 4. The robot also comprises a tool attachment 6. The outer part of the robot hand with the tool attachment 6, is rotatable relative to the inner part of the robot hand about a sixth axis. For each of the axes of the robot, there is a level indicator giving a signal, which is a measure of the present rotational angle of the axis. The output signal from the level indicator is transmitted to a control system of the robot.

When the robot is in its calibration configuration, the axis of the robot are in their calibration position, as shown in FIG. 1, the first arm 3 is placed parallel with the first axis, i.e. parallel with the vertical line, the second arm 4 is placed perpendicular to the first arm 3 and the robot hand 5 is placed parallel with the length axis of the second arm, i.e. perpendicular to the vertical line. On an industrial robot, there is usually a plurality of especially formed planes of reference intended for being used during calibration of the robot. In FIG. 1, a body 7 according to the invention is shown arranged on some of these planes of reference. A first plane of reference on the robot is arranged on the base 1, a second plane of reference is arranged on the first arm 3, a third plane of reference is arranged on the second arm 4, and a fourth and last plane of reference is arranged on the tool attachment 6. The fourth plane of reference may also be provided on a detachable plate attached to the tool during the calibration.

Figure 2:
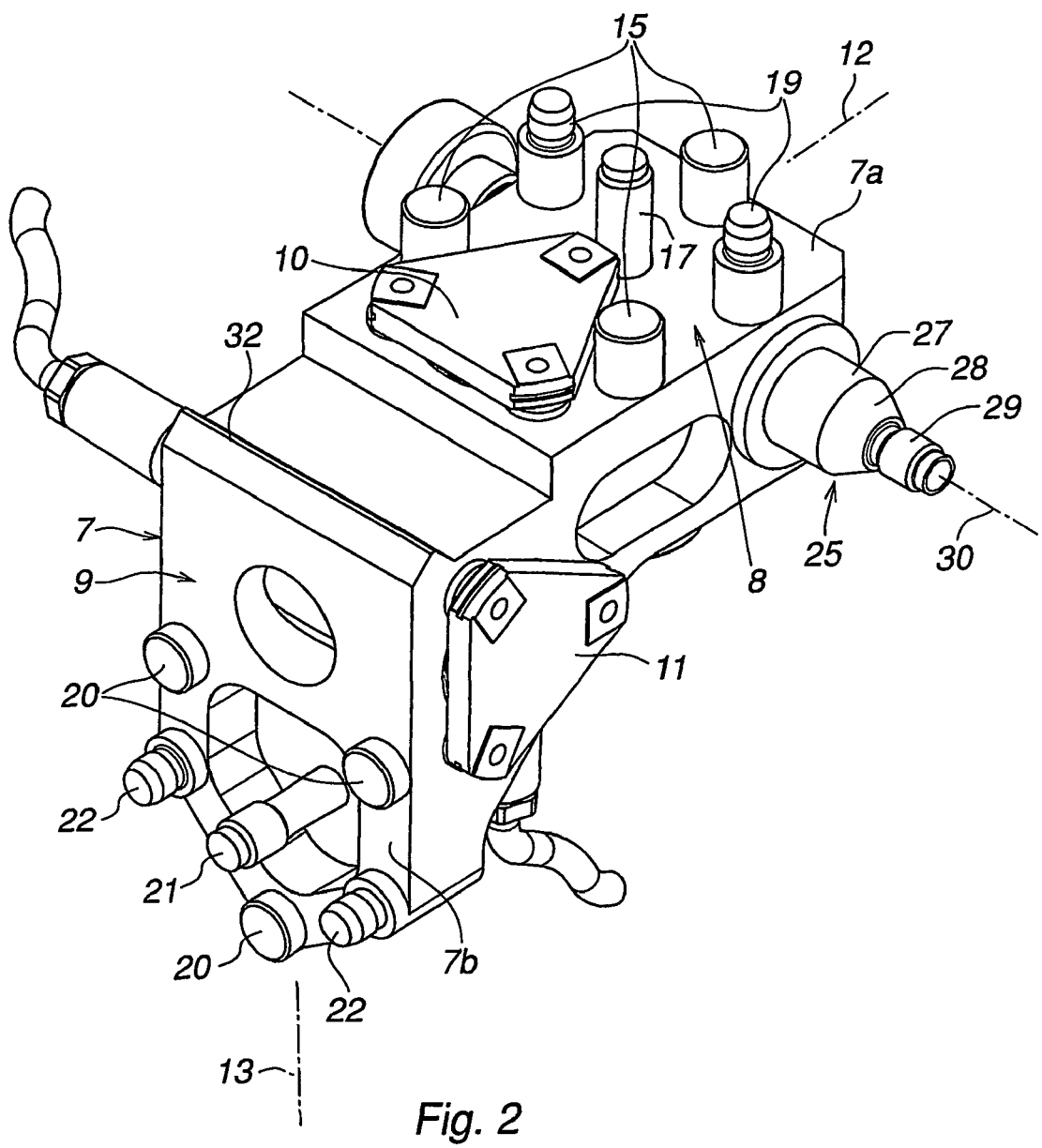
FIG. 2 is in a perspective view showing an embodiment of a calibration apparatus according to the invention.
Figure 3:
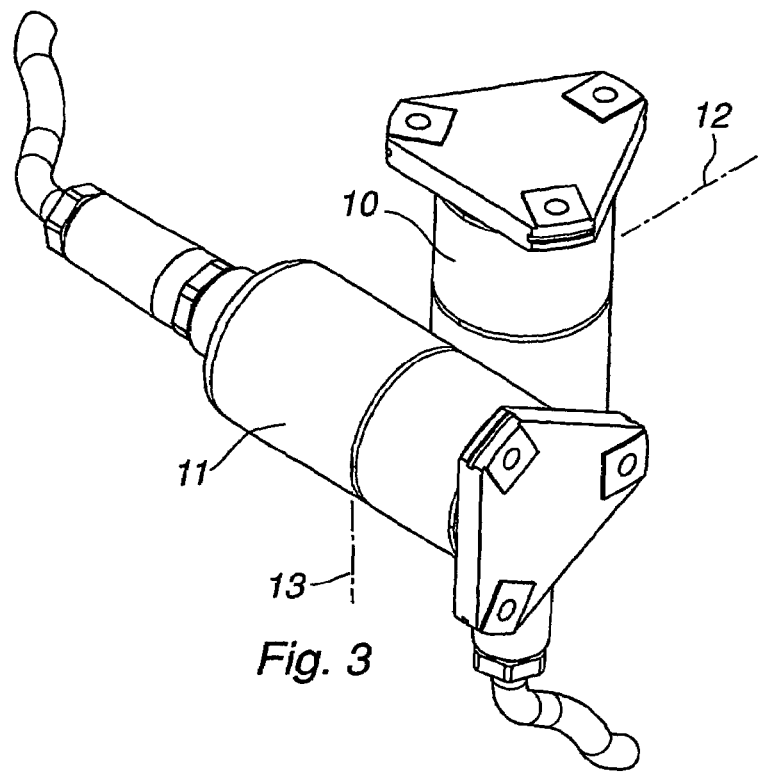
FIG. 3 is a perspective view showing how the angle-measuring members are positioned relative to each other in the calibration apparatus.

FIGS. 2 show an embodiment of a calibration apparatus according to the invention. The apparatus comprises a body 7 having a first and a second mounting arrangement 8, 9 for mounting the body to the planes of reference of the robot. The body further comprises two angle-measuring members 10, 11 in the form of inclinometers measuring the angle of an object relative to the vertical line. An inclinometer functions as an electronic level and measures the inclination angle about a measuring axis. The inclinometers 10, 11 are positioned with their measuring axes 12, 13 perpendicular to each other. FIG. 3 shows the angle-measuring members 10, 11 in more detail.

The body 7 is essentially L-shaped having a first and a second branch 7a, 7b arranged essentially perpendicularly to each other. The first mounting arrangement 8 is mounted on a surface of the first branch 7a and the second mounting arrangement 9 is mounted on a surface of the second branch 7b. Accordingly, the mounting arrangements are arranged perpendicularly to each other. The first angle-measuring member 10 is positioned with its measuring axis 12 essentially parallel to the surface of the first branch 7a and perpendicular to the surface second branch 7b. The second angle-measuring member 11 is positioned with its measuring axis 13 essentially perpendicularly to the surface of the first branch 7a and parallel to the surface second branch 7b.

Figure 4A:
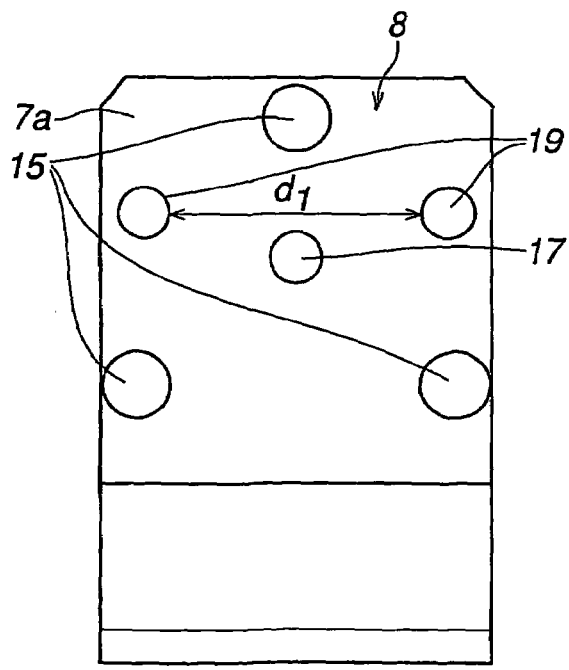
FIG. 4a is a side view showing a first side of the calibration apparatus in FIG. 2.

FIG. 4a shows a front view of the surface of the first branch 7a. The first mounting arrangement 8 comprises three protruding contact elements 15 adapted for being in contact with the plane of reference during the calibration, an attachment element 17 for removably attaching the body to the plane of reference and key means 19 adapted for fitting in with corresponding key means on the plane of references. The contact elements 15 are arranged so that the body 7 is in contact with the plane of reference through the contact elements during the calibration. In this embodiment, the contact elements 15 are cylindrical and one end thereof fixedly connected to the surface of the body and the other end flat and intended to bear on the surfaces of the plane of reference or on a plate having a corresponding function, which plate is mounted on the robot. The three contact elements 15 are arranged as the corners of a triangle.

In a preferred embodiment, the attachment element 17 is a screw intended to be attached to a corresponding hole with threads provided in the plane of reference. Alternatively, a magnet, a spring arrangement or a bayonet may be used as an attachment element. The key means 19 comprises two protruding elements adapted to fit in with corresponding notches in the plane of reference. The distance $d_1$ between the protruding elements is the same as the distance between the corresponding notches in the plane of reference. The body shall be differently orientated depending on which of the calibration plans the body shall be mounted to. The key means helps the robot operator to position the body correctly to the plane of reference.

Figure 4B:
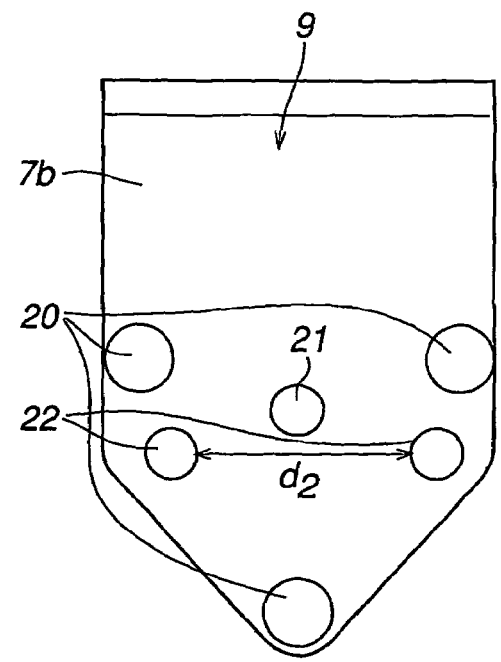
FIG. 4b is a side view showing a second side of the calibration apparatus in FIG. 2.

FIG. 4b shows a front view of the surface of the second branch 7b. The second mounting arrangement 9 comprises three protruding contact elements 20, an attachment element 21, and key means 22 arranged in the same manner as in the first mounting arrangement 8. The distance $d_2$ between the protruding elements 22 of the second mounting arrangement 9 differs from the distance $d_1$ between the protruding elements 19 of the first mounting arrangement 8. Hence, it is impossible to mount the mounting arrangement to the wrong plane of reference and accordingly the body will always be correctly orientated. The first mounting arrangement 8 fits in with the first and the third plane of reference and the second mounting arrangement 9 fits in with the second and the fourth plane of reference. For small robots, it is possible to reduce the number of planes of reference to only three. The third, fourth, fifth, and sixth axis can be calibrated using the same plane of reference, e.g. the plane of reference of the tool attachment 6.

Figure 5:
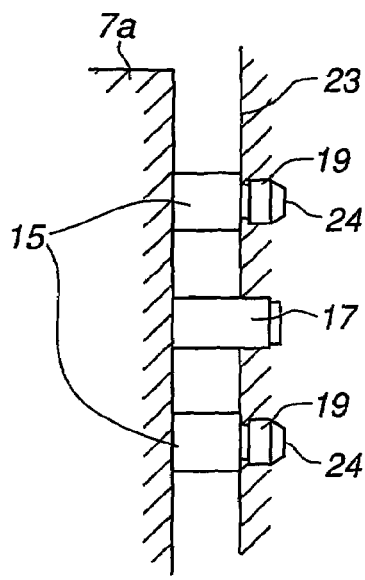
FIG. 5 is a sectional view showing the calibration apparatus and the plan of reference of the robot during calibration.

FIG. 5 shows how the first branch 7a of the body is mounted to a plane of reference 23 of the robot. The contact elements 15 are bearing on the flat surface of the plane of reference, the screw 17 is engaged to a corresponding hole in the plane of reference, and the protruding elements 19 of the key means are recessed in corresponding notches 24 in the plane of reference 23.

During the calibration process, the body 7 is attached through the first mounting arrangement to the plane of reference on the base 1 of the robot. Reference angles are read from the first and the second angle-measuring member. The reference angles are stored in the control system of the robot. Thereafter, the axes 26 are calibrated by attachment of the body 7 to the other planes of reference, reading any of the inclinometers and calculating the difference between the read angle and the angle of reference of that inclinometer. This calculation is performed in the control system of the robot. Thereafter, the control system orders the axis being calibrated to move in dependence of the calculated difference until the difference has a predetermined value and the axis ends up in its calibration position. Usually, the predetermined value of the difference is zero. During calibration of the wrist axes, i.e. the axes 5 and 6, the body 7 is attached by the second mounting arrangement to the tool attachment 6. Thus, the same body can be used to calibrate axes, which are perpendicular to each other.

The axes 2–6 of the robot are possible to calibrate with the body attached to the planes of reference. But the first axis of the robot, which axis is parallel to the vertical line, is not possible to calibrate in the same manner. For calibration of the first axes of the robot, the calibration apparatus is provided with a mounting member 25 for pivotal connection of the body 7 to the stand 2 of the robot. The mounting member 25 comprises a shaft 27, an attachment element for attaching the shaft 27 to the stand 2. The attachment element comprises a tapering part 28 and a screw 29 adapted to fit in with a corresponding hole in the stand 2. The body is arranged pivotally about the shaft 27.

The shaft 27 is located in a through-hole in the first branch 7a of the body 7. The axis 30 of the shaft 27 is arranged perpendicular to the measuring axis 12 of the first angle-measuring member 10. The calibration apparatus further comprises a calibration element for mounting to the base 1 of the robot and the body comprises an elongated protruding portion 32 adapted for being in contact with said calibration element during calibration of the first axis. The portion 32 is located in the outer corner connecting the first and the second branch of the body. The longitudinal axis of the portion 32 is parallel to the axis 30 of the shaft 27. In another embodiment, the portion 32 consists of a rod positioned in a recess in the body 7.

Figure 6A:
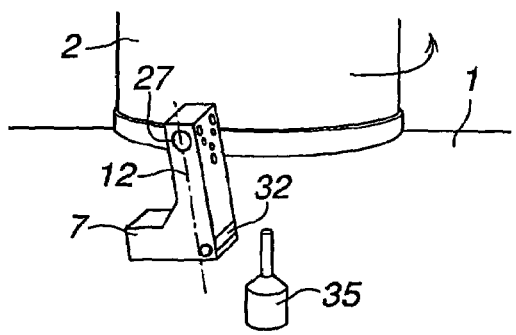
FIGS. 6a–6c are perspective views showing the body and the robot during calibration of an essentially vertical axis.

FIG. 6a shows the calibration apparatus when it is used for calibration of the first axis of the robot. The body 7 is pivotally attached to the stand 2 of the robot through the shaft 27. An elongated calibration element 35 is mounted to the base 1 of the robot. The calibration element 35 is vertically positioned on the base. The calibration element 35 is arranged such that it is removable from the base after the calibration has been carried out. Due to the L-shape of the body, the centre of gravity of the body is displaced in relation to an axis through the mounting member 27 and the portion 32. The displacement is about 5 mm. Therefore, the surface of the first branch 7a is not vertical when the body is connected to the stand 2 and consequently the measuring axis 13 of the second inclinometer 11 is not vertical. Thus, the measuring angle differs from the vertical line.

Figure 6B:
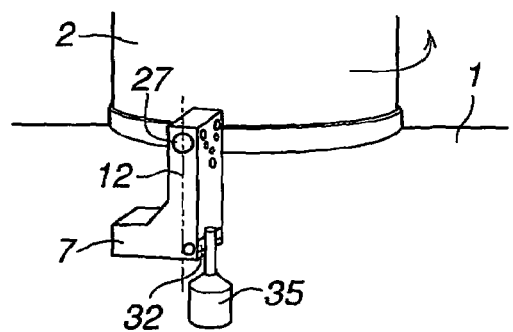
Figure 6C:
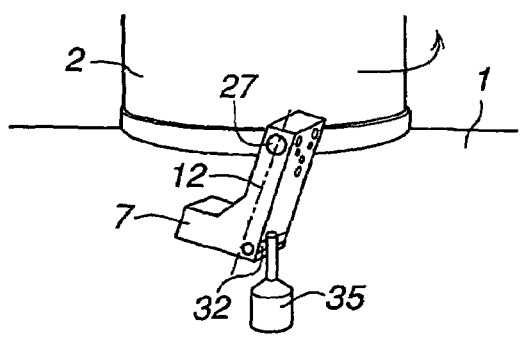

The calibration of the first axes is illustrated in FIGS. 6a–6c. To begin with, the calibration element 35 is mounted to the base 2 and the body is attached to the stand 2 by attaching the mounting member 25 to the stand 2. The stand 2 is then moved to a rough calibration position, i.e. a position close to the calibration position. A rough calibration position is within 10° from the actual calibration position. At wider angles, the inclinometers may not work properly. The angle measurements from the first inclinometer 10 are read during the calibration. The angle measurements correspond to the angle between the measuring axis 12 and the vertical line. Thereafter, the stand 2 is moved about the first axis until the body is in contact with the calibration element 32 and the stand 2 is further moved in response to said measured angle until the first axis is calibrated, i.e. the axis ends up in its calibration position. As shown in the FIGS. 6a–6c the body 6 functions as a pendulum rotating about a horizontal axis during the calibration of the first axis.

In an embodiment of the invention, the calibration is controlled by software in the control system of the robot. The control system receives signals from any of the inclinometers, which signals correspond to the angle between the measuring axis of the inclinometer and the vertical line. The software produces control signals in response to the received signals from the inclinometer and then sends the control signals to the robot. The robot is moved in accordance with the received control signals until the axis is in its calibration position. This method is repeated for each axis until all the axes of the robot are calibrated. The control system comprises necessary equipment, such as a processor, memory, and I/O units, for running the software, which performs the calibration.

Figure 7:
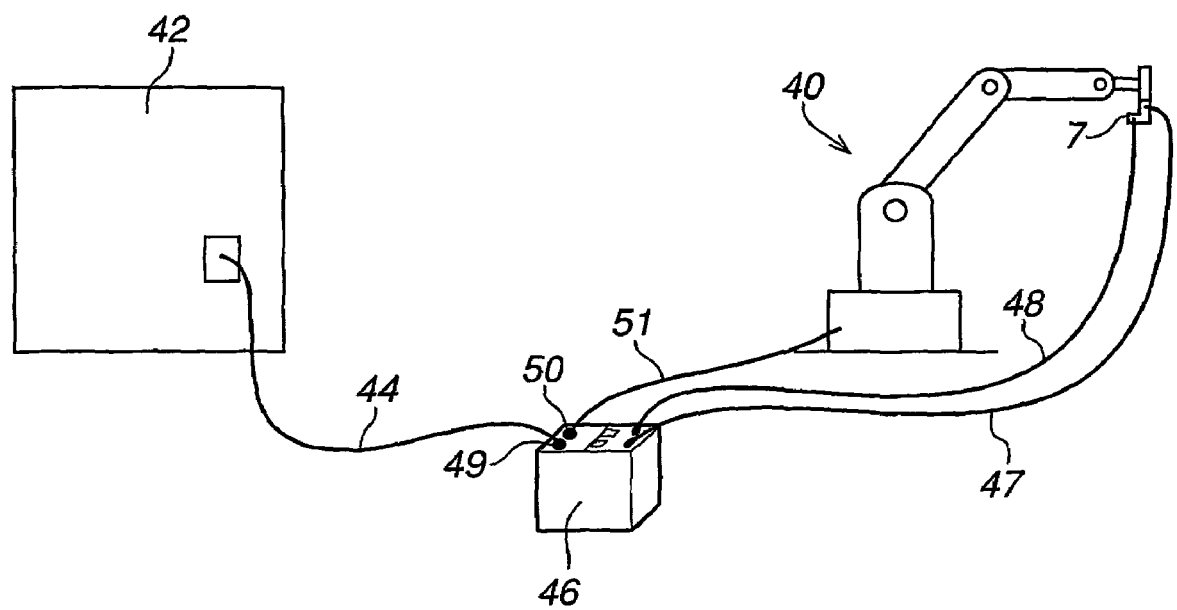
FIG. 7 shows the electrical connection of the calibration apparatus according to an embodiment of the invention.

FIG. 7 shows a robot 40 connected to a control unit 42 comprising the control system of the robot. The control unit 42 is coupled to the robot via a cabling member 44 adapted for transmitting signals and data between the robot 40 and the control unit 42 and for transmitting power to the robot. The calibration apparatus according to an embodiment of the invention comprises a junction member 46 electrically connected to the angle-measuring members 10, 11 of the body 7 via two cables 47, 48. The junction member 46 comprises a first connector 49 for connection of the cabling member 44 to the control unit 42, a second connector 50 for connection of a second cabling member 51 to the robot 40 and a series-measuring card adapted for transmitting power to the angle-measuring member and transmitting measurement values from the angle-measuring members via the cabling member 44 to the control system.

During normal operation of the robot, the control unit 42 is connected to the robot 40 via the cabling member 44, which is connected to the robot. During calibration of the robot, the control unit 42 is connected to the robot 40 via the cabling member 44, the junction member 46 and the cabling member 51. The angle-measuring members of the body 7 are supplied with power and signals are transmitted to the control unit via the cabling member 44, the junction member 46 and the cables 47 and 48.

The present invention is not limited to the embodiments disclosed but may be varied and modified within the scope of the following claims. The robot may in some applications be mounted at the ceiling, with the base located above the stand. The calibration apparatus of the present invention can be used for calibration of the first axis when the robot is mounded upside down, if the body and the calibration element are attached to each other by any resilient means, such as a rubber band, for avoiding that the body rotates due to the gravity.

The body may have different shapes, but should preferable comprise two flat plan, for example the body can be cubical.

It is also possible to provide the base with more than one calibration element. If it is difficult to reach the calibration element during the calibration it is advantageous to have a plurality of calibration element to chose between. The calibration element may either be removable or fixtly mounted. The calibration element may consist of a machined portion of the base.

In another embodiment, the body is used as a pendulum for calibration of the non-vertical axes as well as the vertical axes of the robot. In this embodiment the calibration element and the body is mounted on the same section during calibration. This embodiment is advantageous since it is sufficient to provide the body with one mounting means, the pivotal mounting member.

The order in which the axes are calibrated could of course be different from the order described above, for example the first axis may be calibrated before the other axes.

The present invention is also useful for parallel cinematic manipulators.

The invention claimed is:

1. An apparatus for calibration of an industrial robot, the apparatus comprising
    a body having a first angle-measuring member arranged for measuring an angle relative to the vertical line about a first measuring axis,
    mounting means for mounting the body to the robot during the calibration, and
    a second angle-measuring member arranged for measuring an angle relative to the vertical line about a second measuring axis differing from the first measuring axis,
    wherein said mounting means comprises a first mounting arrangement for mounting the body to a plane of reference of the robot, the mounting arrangement comprising three protruding contact elements being arranged so that the body is in contact with the plane of reference through said contact elements during the calibration, wherein said mounting means further comprises a second mounting arrangement for mounting the body to a second plane of reference on the robot, wherein said second mounting arrangement is arranged in an angle relative to the first mounting arrangement, and wherein said angle essentially corresponds to the angle between two planes of reference of the robot when the robot is in its calibration configuration.

2. The apparatus according to claim 1, wherein the second angle-measuring member is arranged with its measuring axis essentially perpendicular to the measuring axis of the first angle-measuring member.

3. The apparatus according to claim 1, wherein each of the contact elements comprises a flat portion adapted for being in contact with the plane of reference during the calibration.

4. The apparatus according to claim 1, wherein the contact elements are arranged so that they form corners of a triangle.

5. The apparatus according to claim 1, wherein the first mounting arrangement comprises an attachment element for attaching the body to the plane of reference.

6. The apparatus according to claim 5, wherein the attachment element is a screw.

7. The apparatus according to claim 1, wherein the first mounting arrangement is arranged in a first plan and the second mounting arrangement is arranged in a second plane being essentially perpendicular to the first plan.

8. The apparatus according to claim 1, wherein the first mounting arrangement comprises key means adapted for cooperating with corresponding key means on the first plane of references, that the second mounting arrangement comprises key means adapted for cooperating with corresponding key means on the second plane of reference, and that the key means of the first mounting arrangement differs from the key means of the second mounting arrangement.

9. The apparatus according to claim 8, wherein each key means of the mounting arrangements comprises at least one protruding element adapted to fit in with a corresponding notch in the plane of reference, and the key-means of the first and the second mounting arrangement have different shape.

10. The apparatus according to claim 8, wherein each key means of the mounting arrangements comprises at least two protruding elements adapted to fit with corresponding notches in the plane of reference and that the distance between the protruding elements differs between the first mounting arrangement and the second mounting arrangement.

11. The apparatus according to claim 1, wherein the mounting means further comprises a mounting member for pivotally connecting the body to the robot.

12. The apparatus according to claim 11, wherein said mounting member comprises a shaft having an attachment element for attaching the shaft to the robot, the body being arranged pivotal about that shaft.

13. The apparatus according to claim 11, further comprising:
a calibration element for mounting to the robot, wherein the body comprises a portion adapted for being in contact with said calibration element during calibration.

14. The apparatus according to claim 13, wherein the body is shaped so that its center of gravity is displaced in relation to an axis through said mounting member and said portion adapted for being in contact with said calibration element.

15. The apparatus according to claim 13, wherein the body is essentially L-shaped having a first and a second branch essentially perpendicular to each other, said mounting member and said portion being located at or in the vicinity of the first branch.

16. The apparatus according to claim 1, wherein the robot is connected to a control system via a cabling member adapted for transferring power and signals between the robot and the control system, wherein the apparatus further comprises a junction member electrically connected to the angle-measuring member, the junction member being provided with a connector for connection to said cabling member and means for transferring power to the angle-measuring member and transferring measurement values from the first angle-measuring member and second angle-measuring member via said cabling member.

17. A method for calibration of an industrial robot having a plurality of sections movably connected to each for rotation about a plurality of axes, using an apparatus according to claim 1, the method comprising:
attaching the body to a section of the robot,
reading an angle measurement from the first angle-measuring member,
moving the robot about a first axis in dependence of said angle measurement from the first angle-measuring member,
reading an angle measurement from the second angle-measuring member, and
moving the robot about a second axis in dependence of said angle measurement from the second angle-measuring member.

18. The method for calibration of an industrial robot according to claim 17, comprising:
providing the robot with a protruding calibration element,
pivotally attaching the body to a section being movable about an essentially vertical axis,
moving the section about said vertical axis until the body is in contact with the calibration element,
reading an angle measurement from the first angle-measuring member, and
moving the section about said vertical axis in dependence of said angle measurement from the first angle-measuring member.

19. The method for calibration of an industrial robot according to claim 17, wherein the step of attaching the body to a section of the robot comprises:
bringing the contact elements of the calibration body into contact with a plane of reference on the robot, and
attaching the calibration body to the plane of reference.

20. A computer program product comprising a computer readable medium, having thereon a computer readable program means which, when run on a computer, makes the computer perform calibration of an industrial robot with a calibration apparatus according to claim 1, the computer program means comprising computer program instructions executable by a process for performing the steps of:
receiving an angle measurement from the first angle-measuring member,
sending control signals to the robot about moving a first axis of the robot in dependence of said angle measurement from the first angle-measuring member,
receiving an angle measurement from the second angle-measuring member, and sending control signals to the robot about moving a second axis in dependence of said angle measurement from the second angle-measuring member.

* * * * *